US010572267B2

(12) United States Patent
Lewis et al.

(10) Patent No.: US 10,572,267 B2
(45) Date of Patent: Feb. 25, 2020

(54) BIOS USER INTERFACE CONTROL USING MOBILE DEVICE

(71) Applicant: Insyde Software Corp., Taipei (TW)

(72) Inventors: Timothy Andrew Lewis, El Dorado Hills, CA (US); Jeremy Wang, New Taipei (TW); Peter Yu, Taipei (TW); Lawrence Chiu, New Taipei (TW)

(73) Assignee: Insyde Software Corp., Taipei (TW)

( * ) Notice: Subject to any disclaimer, the term of this patent is extended or adjusted under 35 U.S.C. 154(b) by 483 days.

(21) Appl. No.: 14/074,270

(22) Filed: Nov. 7, 2013

(65) Prior Publication Data

US 2014/0136828 A1 May 15, 2014

Related U.S. Application Data

(60) Provisional application No. 61/724,520, filed on Nov. 9, 2012.

(51) Int. Cl.
*G06F 9/44* (2018.01)
*G06F 9/4401* (2018.01)

(52) U.S. Cl.
CPC ................... *G06F 9/4416* (2013.01)

(58) Field of Classification Search
CPC ................ G06F 1/28; G06F 1/26; G06F 1/00
USPC ....... 713/300, 310, 320, 321, 322, 323, 324, 713/340, 375
See application file for complete search history.

(56) References Cited

U.S. PATENT DOCUMENTS

| 6,317,798 | B1 | 11/2001 | Graf |
| 6,523,111 | B1 | 2/2003 | Smolski |
| 6,560,641 | B1 * | 5/2003 | Powderly ............... G06F 9/544 707/999.01 |
| 6,978,315 | B1 * | 12/2005 | Burrell .................. G06F 3/1423 709/220 |
| 7,114,066 | B1 * | 9/2006 | Swaminathan ....... G06F 9/4445 713/1 |
| 7,904,708 | B2 | 3/2011 | Harmer |
| 8,484,325 | B1 * | 7/2013 | Maity ..................... H04L 67/16 709/217 |
| 2004/0243883 | A1 * | 12/2004 | Shankar ................ G06F 11/362 714/38.14 |
| 2007/0043833 | A1 * | 2/2007 | Lu .......................... H04L 67/34 709/219 |
| 2008/0301422 | A1 | 12/2008 | Johnson et al. |
| 2009/0132799 | A1 | 5/2009 | Brumley et al. |
| 2009/0210689 | A1 * | 8/2009 | Harmer ................. G06F 9/4401 713/2 |
| 2010/0136957 | A1 * | 6/2010 | Horodezky ............ G06F 3/017 455/414.2 |
| 2011/0283314 | A1 * | 11/2011 | Tang .................. H04N 21/4143 725/37 |
| 2013/0130777 | A1 * | 5/2013 | Lemay ................ G07F 17/3218 463/25 |
| 2014/0113682 | A1 * | 4/2014 | Polehn ............ H04M 1/72522 455/556.1 |

* cited by examiner

*Primary Examiner* — Mohammed H Rehman
*Assistant Examiner* — Keshab R Pandey
(74) *Attorney, Agent, or Firm* — McCarter & English, LLP

(57) ABSTRACT

A technique for managing a Unified Extensible Firmware Interface (UEFI) Basic Input/Output System (BIOS)-controlled computing device from a separate mobile computing device is discussed.

16 Claims, 8 Drawing Sheets

BIOS USER INTERFACE CONTROL USING MOBILE DEVICE

RELATED APPLICATION

This application is related to, and claims the benefit of, U.S. Provisional Patent Application No. 61/724,520 entitled "Bios User Interface Control Using Mobile Device" filed on Nov. 9, 2012, the contents of which are incorporated herein by reference in its entirety.

BACKGROUND

Computing devices are initialized by firmware included within the device and this firmware provides a range of software services which facilitate the boot of the operating system (OS) as well as providing a smaller subset of these services that continue to be available after the operating system has booted. Firmware is software that has been written onto Read-Only Memory (ROM) modules including, but not limited to, ROM, PROM, EPROM, EEPROM, and Flash ROM (collectively referred to hereafter as "ROM"). Among other services, the firmware is responsible for operation of the computing device until a boot process can be run which loads an operating system for the computing device into memory. Once loaded, the operating system is in charge of normal operation of the computing device although the provision of certain services after loading of the operating system may require a transition of control from the operating system back to the firmware for security and other reasons.

Unified Extensible Firmware Interface (UEFI) is a specification created by a non-profit industry body detailing a programming interface between the Operating System and the included firmware of a computing device such as, but not limited to, a Personal Computer (PC). UEFI specifications describe a set of tools by which a computing device can move in an organized fashion from the power-applied state to fully operational. The UEFI specification tells the desired result but deliberately does not specify the internal tactic of implementation. The UEFI firmware specification replaces earlier operating system (OS)/firmware interfaces previously used by the industry and commonly known as legacy BIOS (Basic Input Output System).

When implemented in a computing device, the machine codes for UEFI firmware and all permanent data used by the firmware reside in ROM. In many cases the ROM is an Electrically Erasable silicon device known as a flash ROM. Flash ROM has the characteristic that it can be erased by electrical command and individual elements may then be written and the device will retain the data indefinitely. When power is first applied to the computing device, the device executes a process called reset which clears the state to a known condition and begins execution of the firmware. The firmware is read from the ROM. Among other services, the firmware is responsible for operation of the computing device until a boot process can be run which loads an operating system for the computing device into memory. Once loaded, the operating system is in charge of normal operation of the computing device.

A typical computing system uses a keyboard or mouse (connected via a PS/2 style interface or USB) and a monitor. With the advent of touch-based systems, in many instances the keyboard and/or mouse interfaces have been replaced by touch panels and virtual keyboards on the screen. This is especially true for handheld mobile devices such as smart phones and tablet devices.

BRIEF SUMMARY

In embodiments of the present invention a connection is established between a remote console application executing on a mobile computing device and a UEFI BIOS-controlled computing device in order to enable control of the UEFI BIOS-provided user interface from the mobile device. Data for a screen display for the UEFI BIOS is received by the mobile computing device over the established connection and displayed on the mobile device screen. User input actions on the mobile device with respect to the BIOS that are made without the benefit of a physical keyboard or mouse are translated into keystrokes, mouse button selections and/or mouse movements and transmitted over the connection to the remote console driver working with the UEFI BIOS on the UEFI BIOS-controlled computing device. The firmware on the UEFI BIOS-controlled computing device processes the translated input and updates a screen display for the UEFI BIOS as a result. A copy of the screen update for the BIOS user interface is sent over the connection to the mobile computing device so it can be displayed on the mobile device.

In one embodiment, a method for remotely managing a Unified Extensible Firmware Interface (UEFI) Basic Input/Output System (BIOS)-controlled computing device, includes establishing a transport layer connection between an application executing on a mobile computing device and firmware executing a UEFI BIOS on a computing device. The method also receives at the mobile computing device, over the transport layer connection, a copy of a screen display for the UEFI BIOS. The copy of the screen display is displayed on the mobile computing device. The method further includes receiving user input actions on the mobile computing device with respect to the UEFI BIOS screen display. The received user input actions are translated into at least one of keystrokes, mouse button actions and mouse movements. Additionally, the method transmits the translated input actions from the mobile computing device to the UEFI BIOS over the transport layer connection. Following processing of the transmitted input actions by the firmware, the mobile computing device receives, over the connection, screen display updates for the UEFI BIOS. The UEFI BIOS screen updates are displayed on the mobile computing device.

In another embodiment, a Unified Extensible Firmware Interface (UEFI) Basic Input/Output System (BIOS)-controlled computing device includes a processor; a network interface and a firmware-managed UEFI BIOS. A copy of a screen display for the UEFI BIOS is transmitted over a transport layer connection between an application executing on a mobile computing device and the UEFI BIOS. The firmware receives over the transport layer connection from the mobile computing device network packets that represent user input actions related to the UEFI BIOS. Additionally, the firmware generates screen display updates for the UEFI BIOS following processing of the received user input actions and transmits a copy of the screen updates to the mobile computing device.

In an embodiment, a method for remotely managing a Basic Input/Output System (BIOS) of a computing device includes establishing a connection between an application executing on a mobile computing device and firmware executing a BIOS on a computing device. The method also receives at the mobile device over the connection a copy of a screen display for the BIOS. The copy of the screen display is displayed on the mobile computing device. User input actions are received on the mobile computing device with respect to the BIOS screen display and translated into at least one of keystrokes, mouse button actions and mouse movements. The translated input actions are transmitted to the BIOS over the connection. The method also receives at the mobile computing device, over the connection, screen display updates for the BIOS following processing of the transmitted input actions by the firmware. The screen updates are displayed on the mobile computing device.

In one embodiment, a computing device with a remotely manageable Basic Input/Output System (BIOS), includes a processor, a network interface, and a firmware-managed BIOS. The firmware transmits a copy of a screen display for the BIOS over a connection to a mobile computing device, the connection established between an application executing on the mobile computing device and the BIOS. The firmware also receives network packets representing user input actions related to the BIOS from the mobile computing device over the connection and generates screen display updates for the BIOS following processing of those received user input actions. A copy of the screen updates for the BIOS is transmitted to the mobile computing device.

BRIEF DESCRIPTION OF THE DRAWINGS

The accompanying drawings, which are incorporated in and constitute a part of this specification, illustrate one or more embodiments of the invention and, together with the description, help to explain the invention. In the drawings.

DETAILED DESCRIPTION

Figure 1:
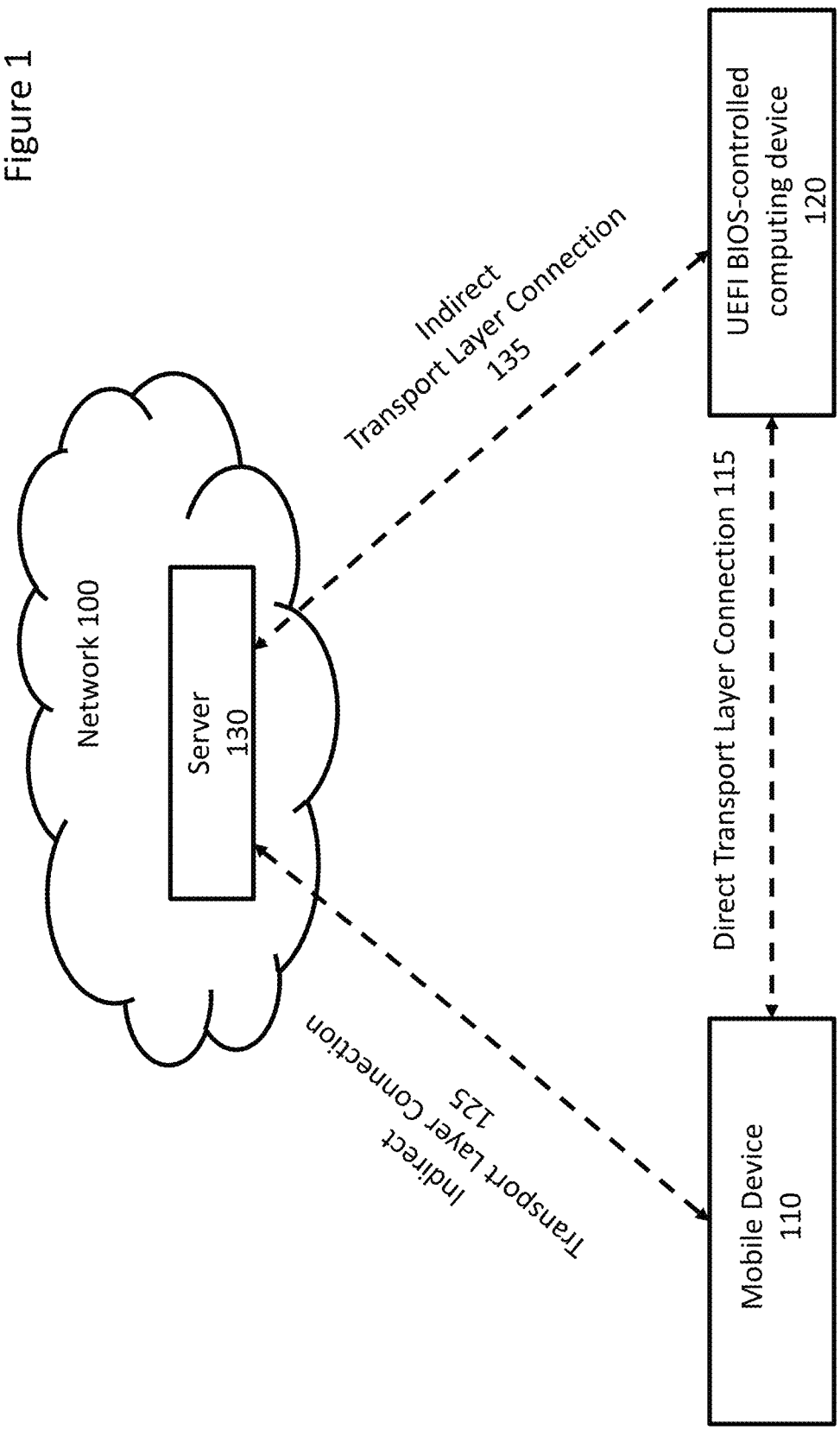
FIG. 1 depicts several different types of transport layer connections that may be utilized by an embodiment of the present invention.

Embodiments of the present invention use a mobile computing device platform, such as that provided by the iOS™ or Android™ operating systems in mobile computing devices to control a UEFI (or other) BIOS of a separate computing device. The mobile computing device can act as an alternate means for remotely managing the BIOS of a separate computing device by using a remote console application running on the mobile computing device. The mobile computing device (also referred to herein as "mobile device") may be a mobile phone, tablet or other type of mobile computing device that is able to establish a connection to the separate computing device running the BIOS. The separate computing device may or may not be in close physical proximity to the mobile device. A copy of a screen display for the BIOS of the separate computing device is transmitted to, and displayed on, the mobile device. The remote console application of the present invention receives user input actions at the mobile device with respect to the displayed copy of the BIOS, translates the input actions if necessary to provide support for a physical keyboard, button and/or mouse interfaces if such are not normally supported by the mobile device, and sends the translated input actions to the BIOS of the separate computing device. Following processing of the transmitted input actions by the firmware BIOS, locally generated screen updates on the separate computing device are sent back to the mobile device to update the displayed copy of the BIOS on the mobile device.

In an embodiment of the present invention, both the user of a separate computing device, such as, but not limited to a PC, and a user of a mobile device can see the same screen display and mouse cursor position of the firmware-generated BIOS user interface. The mobile device screen display can be scaled according to the screen resolution of the mobile device running the application or else panned. The user of the separate computing device can use either local input options such as a mouse or keyboard or alternatively may choose to use the user input options available via the mobile device to manage the BIOS of the separate computing device. The firmware of the separate computing device may send a screen display and/or mouse cursor position packet to the mobile device and in turn may receive network packets with user input actions from the mobile device. The user of the mobile device may move a mouse (or virtual mouse equivalent using the mobile device's pointer) to enter input actions related to the displayed copy of the BIOS user interface. Similarly, the user of the mobile device may use physical or virtual keys or buttons to enter input actions with respect to the BIOS user interface of the separate computing device that is being displayed on the mobile device. Data from these user input actions are translated into mouse and/or keyboard data and sent as network packets to the firmware-controlled BIOS of the separate computing device.

Embodiments of the present invention provide the ability to pair a specific mobile computing device and a specific separate computing device so that data can be transported to and from a client on each device. In one embodiment of the present invention, a remote console application on a mobile computing device communicates with a UEFI BIOS on a separate computing device over a transport layer connection. The process of pairing can include a traditional Bluetooth pairing process which creates a bond between two devices through a user-initiated process. Alternatively, with an ad-hoc wireless connection, either the separate computing device or the mobile computing device can expose itself as an access point with a specific SSID and password.

FIG. 1 depicts several different types of transport layer connections that may be utilized by an embodiment of the present invention to remotely manage from a mobile device the BIOS of the separate UEFI BIOS-controlled computing device. It should be appreciated that although the description herein will, for ease of explanation, describe in various places the separate computing device as being a UEFI BIOS-controlled computing device, the invention is not limited to only UEFI BIOS-controlled computing devices. Rather, in alternate embodiments computing devices equipped with a non-UEFI BIOS may also be remotely managed using the techniques equivalent to those described herein. Accordingly the descriptions of the separate computing device should be understood to refer to both UEFI and non-UEFI BIOS-controlled computing devices. In an embodiment of the present invention, as depicted in FIG. 1, a mobile computing device 110 may communicate with a separate UEFI BIOS-controlled computing device 120 over a direct transport layer connection 115. The mobile computing device 110 (referred to hereafter as "mobile device") may be a mobile phone, tablet computing device, laptop or other computing device equipped with processor and a communication interface and possessing a display capability. The UEFI BIOS-controlled computing device 120 may be a desktop PC, laptop, server other type of UEFI BIOS-controlled computing device. The direct transport layer connection 115 may be an ad-hoc wireless connection, a Bluetooth connection, a Near Field Communication (NFC) or some other type of direct transport layer connection between a remote console application executing on the mobile device 110 and the firmware of the UEFI BIOS-controlled computing device 120.

Alternatively, an indirect connection between the mobile device 110 and the UEFI BIOS-controlled computing device 120 may be established through a shared network server 130. For example, the indirect connection may include an indirect transport layer connection 125 established, for example, using 3G/4G or Wifi between the mobile device 110 and the server 130 in a network 100. The network may be a local intranet, the Internet, a cellular network or some other type of network. The indirect connection may also include an indirect transport layer connection 135 established, for example, using wifi between the server 130 and the UEFI BIOS-controlled computing device 120. With this server-based embodiment, the pairing of devices can happen when both devices 110 and 120 access the server 130 and identify themselves via a user-provided name and password.

Figure 2:
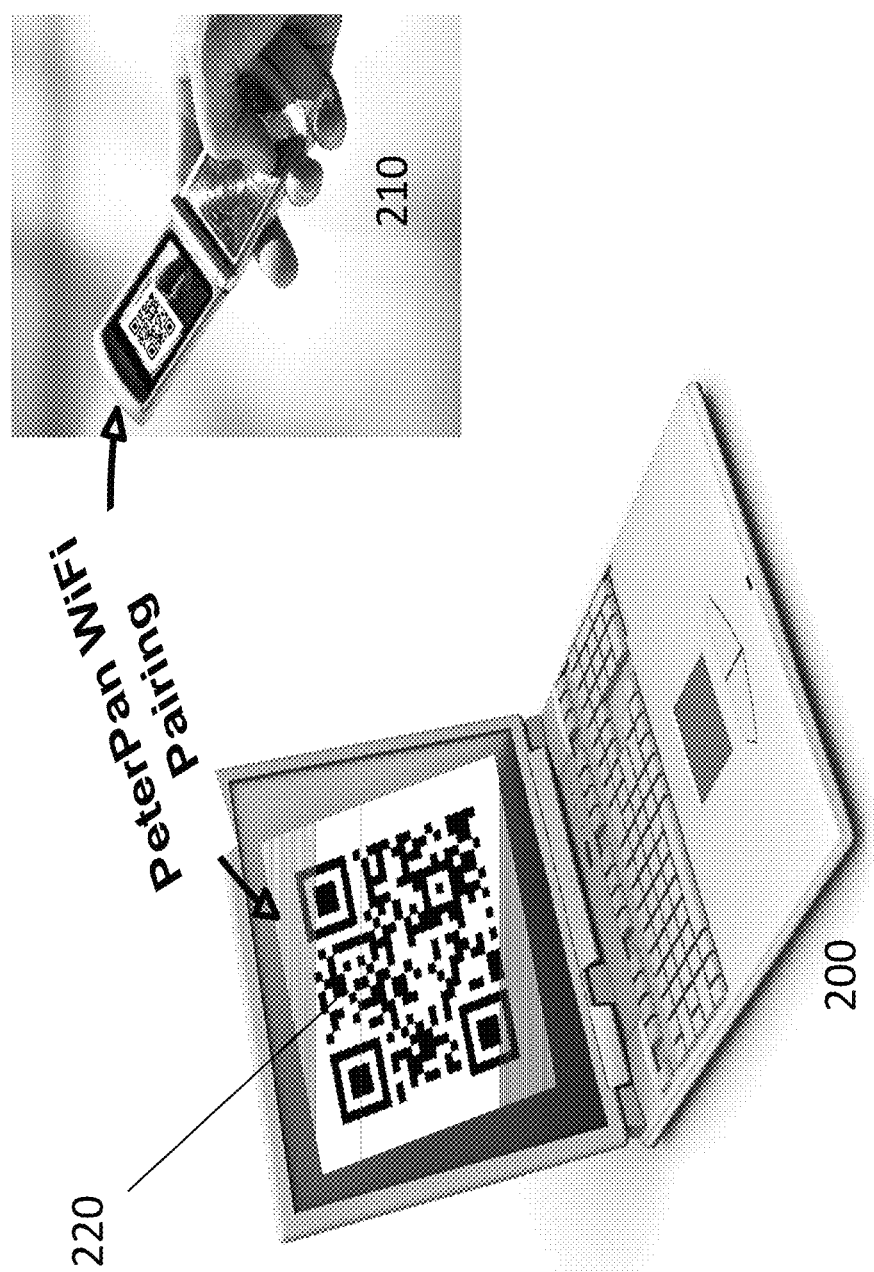
FIG. 2 depicts a password which is displayed in the form of a QR code and used to establish a network connection by an embodiment of the present invention.

In one embodiment, the UEFI BIOS-controlled computing device can act as the access point and randomly generate a password which is displayed in the form of a QR code. FIG. 2 depicts a password randomly generated on a UEFI BIOS-controlled computing device 200 which is displayed in the form of a QR code 220 and used to establish a network connection by an embodiment of the present invention. The user of a mobile device 210 takes a picture of the QR code using an application on the mobile device. The QR code 220 contains the password which is then applied (along with the SSID) to establish the wireless connection locally. In one embodiment, the pairing may be established over multiple transport layers. For example, the information necessary for a wireless access-point connect might be delivered using Bluetooth or NFC. Or the MAC address and temporary authorization code for Bluetooth might be delivered by wireless.

Figure 3:
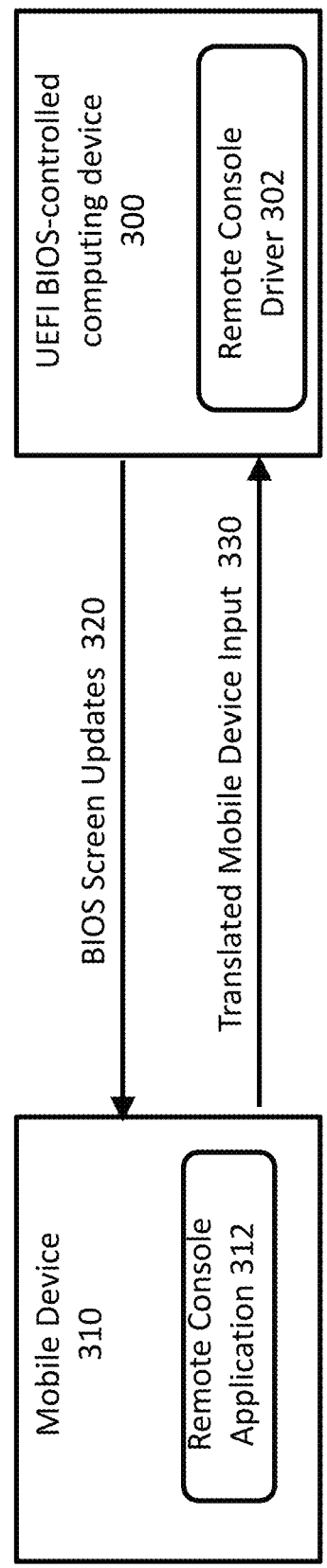
FIG. 3 depicts exemplary data flows sent and received by the mobile device remote console application in an embodiment of the present invention.

Once established, the connection is used for communication between a remote console application running on the mobile device and firmware that includes a remote console driver on the UEFI BIOS-controlled computing device. FIG. 3 depicts exemplary data flows sent and received by the mobile device remote console application in an embodiment of the present invention. As depicted in FIG. 3, the mobile device remote console application 312 is responsible for sending packets over the transport layer to the UEFI BIOS-controlled computing device 300 containing translated user input actions 330 such as user mouse selections, mouse movements and keystrokes. The remote console application 312 also receives packets for BIOS screen updates 320 over the transport layer connection generated using a remote console driver 322 on the paired UEFI BIOS-controlled computing device 300. The BIOS screen updates contain graphical and text display information for the copy of the BIOS UI being displayed on the mobile device 310. The operations of the remote console application 312 and remote console driver 302 are discussed further below.

Many of the today's mobile computing devices lack traditional mouse interfaces or full physical keyboards such as have been conventionally found on PCs and traditionally used in interacting with BIOS interfaces. To address this lack of native interface support so as to allow a mobile device to be used for remote management of a UEFI BIOS of a separate computing device, the remote console application of the present invention translates user input actions as needed before transmitting the user input actions to the UEFI BIOS.

As one example, of providing additional interface support for a mobile device, the remote console application of the present invention that runs on the mobile device may simulate a keyboard device for the UEFI BIOS-controlled computing device. For example, the simulated keyboard may have a current key, ten shift keys (left/right shift, left/right control, left/right alt, left/right logo, menu and system request) and three toggle keys (caps lock, number lock and scroll lock). The remote console application may receive user input and translate that user input so as to modify the current key, the current shift key state or the current toggle key state of the simulated keyboard device. The user input for the simulated keyboard device can take a number of forms. For example, when the user presses a mobile device button or key, or presses on on-screen icon or virtual keyboard button, the button or key may be translated into a new key value. The new key value is fashioned into a keyboard information packet and sent to the firmware of the UEFI BIOS-controlled computing device. Similarly, when a user presses a mobile device button or key, or presses on an on-screen icon or virtual keyboard button, the button or key may be translated into a shift-key value. The new shift key state is fashioned into a keyboard information packet and sent to the firmware. Likewise, when the button or key is released, the new shift-key state is fashioned into a keyboard information packet and sent to the firmware. When the user of the simulated keyboard device presses a mobile device button or key, or presses on an on-screen icon or virtual keyboard button, the button or key may be translated into a toggle-key press and the current toggle-key value is flipped from "set" to "clear" or from "clear" to "set". The new toggle-key state may be fashioned into a keyboard information packet and sent to the firmware of the UEFI-BIOS controlled computing device. In one embodiment, when the user moves the device in a pre-defined manner, the remote console application captures the type of gesture made using the mobile device's accelerometer, gyroscope and/or magnetometer and converts this behavior into one of the actions described above. Each of these user input behaviors may be translated into a network packet containing keystroke information. The keystroke information packets have similar information content as described in the EFI_KEY_DATA structure(FI_KEY_DATA, UEFI Specification, Version 2.3.1A (2011), page 416 (Unified EFI, Inc.) This type of structure contains information about the keystroke value itself as well as the current status of shift keys and toggle keys.

In addition to key presses, the remote console application of the present invention may also translate input to simulate input received from a pointer (mouse or other) device for the UEFI-BIOS-controlled device. The simulated pointer device may have three 32-bit coordinates (X, Y, Z) and three buttons (left, middle, right) which can be either "up" (not pressed) or "down" (pressed). The remote console application receives user input and translates that user input in a way so as to modify the coordinates or button state of the simulated pointer device. For example, when the user presses a specific mobile device screen location, the location of the press may be converted relative to the top-left of the remote console screen area into a new set of coordinates. If the screen image of the UEFI BIOS-controlled computing device is being replicated, then the location of the user's press can be synced with the portion of the screen image being displayed and adjusted to a current zoom level. The new coordinates may be fashioned into a mouse information packet and sent to the firmware of the UEFI BIOS-controlled computing device. Similarly, when the user presses a mobile device icon that represents the left, middle or right mouse button, the remote console application may construct a mouse button information packet containing the current mouse button status and send it to the firmware of the UEFI BIOS-controlled computing device. Likewise, when the user releases the mobile device icon that represents the left, middle or right mouse button, the remote console application may do the same. In one embodiment, when the user presses a specific mobile device physical button or keyboard key, the remote console application can treat the button or keypress as a mouse button press or release and create the mouse button information packet as noted above. In another embodiment, when the user presses specific mobile device physical buttons or keyboard keys or on-screen keyboard keys, such as the arrow keys, the remote console application can update the mouse coordinates and send an updated mouse position information packet to the PC firmware. Each of these behaviors can be translated into a network packet containing mouse position information. The mouse position information packets may have similar information content to that described in the EFI_ABSOLUTE_POINTER_STATE structure (EFI_ABSOLUTE_POINTER_STATE, UEFI Specification, Version 2.3.1a (2011), page 454 (Unified EFI, Inc.). This type of structure contains information about the current mouse position and the current status of the mouse buttons.

Figure 4:
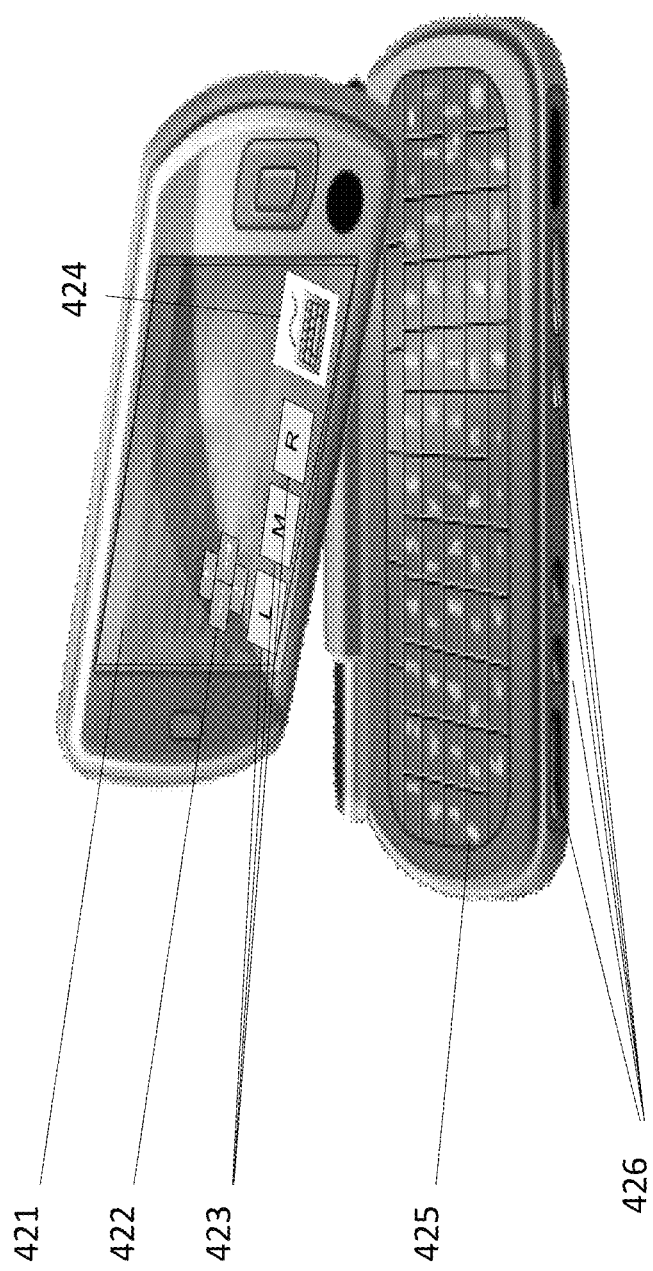
FIG. 4 depicts exemplary user input options available on a mobile device utilized by an embodiment of the present invention.

FIG. 4 depicts exemplary user input options available on a mobile device that may be received and translated as necessary by an embodiment of the present invention. For example, touch input 421 on the screen of the mobile device may be translated and sent as mouse position to the firmware of the UEFI BIOS-controlled device for processing. Similarly, the selection of on-screen icons 422 may be translated and sent as mouse position to the UEFI-BIOS. Other on-screen icons 423 may be selected by a user of the mobile device and translated to mouse button selections and sent to the firmware of the UEFI BIOS-controlled device. The mobile device may also be equipped with an icon 424 that causes a virtual keyboard to be displayed. Touches of the virtual keyboard may then be translated into key presses and sent by the remote console application to the firmware of the UEFI BIOS-controlled computing device. The mobile device may be equipped with a mini keyboard 425 whose key presses may be sent by the remote console application as key presses with or without translation to the UEFI BIOS-controlled computing device. Additionally, the mobile device may be equipped with physical buttons 426 whose selection may be translated into key presses or mouse button selections depending on the mapping and sent to the firmware of the UEFI BIOS-controlled computing device for handling.

Figure 5:
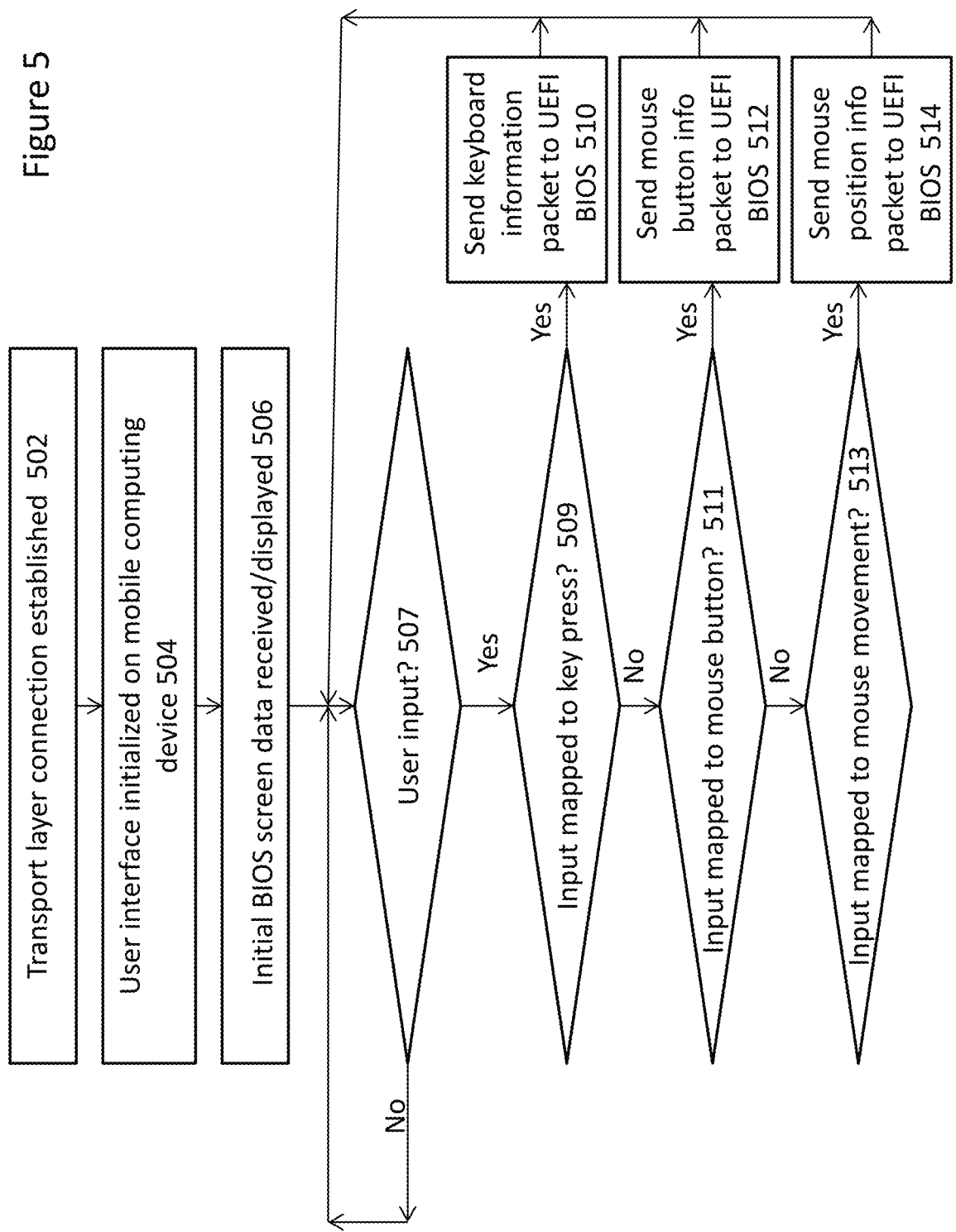
FIG. 5 depicts an exemplary sequence of steps followed by the remote console application in an embodiment of the present invention to receive and handle user input actions.

FIG. 5 depicts an exemplary sequence of steps followed by the remote console application in an embodiment of the present invention to receive and handle user input actions. The sequence begins with the establishment of the transport layer connection between the remote console application and the firmware of the UEFI BIOS-controlled computing device so as to pair the mobile device and the UEFI BIOS-controlled computing device (step 502). The connection method depends on the type of transport layer being used, but the result is that a communication channel is created which allows packets to be transmitted between the UEFI BIOS-controlled computing device and the mobile device. After establishment of the connection is complete, the remote console application initializes the user interface (step 504), receives an initial copy of the screen data for the BIOS UI, and displays a copy of the BIOS screen data on the mobile device (step 506). The user interface includes the visual elements which the user can use to make input actions that will be translated into the selection of specific keys, mouse buttons and/or to indicate mouse movement by the remote console application. The remote console application then waits to receive a user input action related to the displayed screen copy of the BIOS (step 507).

If the user of the mobile device selects a physical mobile device button mapped to a key press, selects a visual element mapped to a key press, or selects a key on the soft (virtual) keyboard such as is found on many phones (step 509), then the remote console application detects the input. The remote console application translates/interprets the user input action as a key press and constructs a keyboard information packet that is sent to the UEFI-BIOS (step 510). The remote console application then waits for the next user input action (step 507). If the user selects a physical mobile device button mapped to a mouse button, a visual element mapped to a mouse button or a key on the soft (virtual) keyboard found on many phones mapped to a mouse button (step 511), then the remote console application translates/interprets the user input action as a mouse button selection, constructs a mouse button information packet and sends it to the UEFI BIOS-controlled computing device (step 512). The remote console application then waits for the next user input action (step 507). If the user of the mobile device selects a physical mobile device button mapped to a mouse movement, a visual element mapped to a mouse movement, a key on the soft (virtual) keyboard found on many phones, or else touches some otherwise unused portion of the application screen (step 513), then the remote console application translates/interprets the user input action as a mouse movement, constructs a mouse position information packet and sends it to the UEFI BIOS-controlled computing device (step 514). The remote console application then waits for the next user input action (step 507). It will be appreciated that the user input actions can be interpreted in any order without departing from the scope of the present invention.

Figure 6:
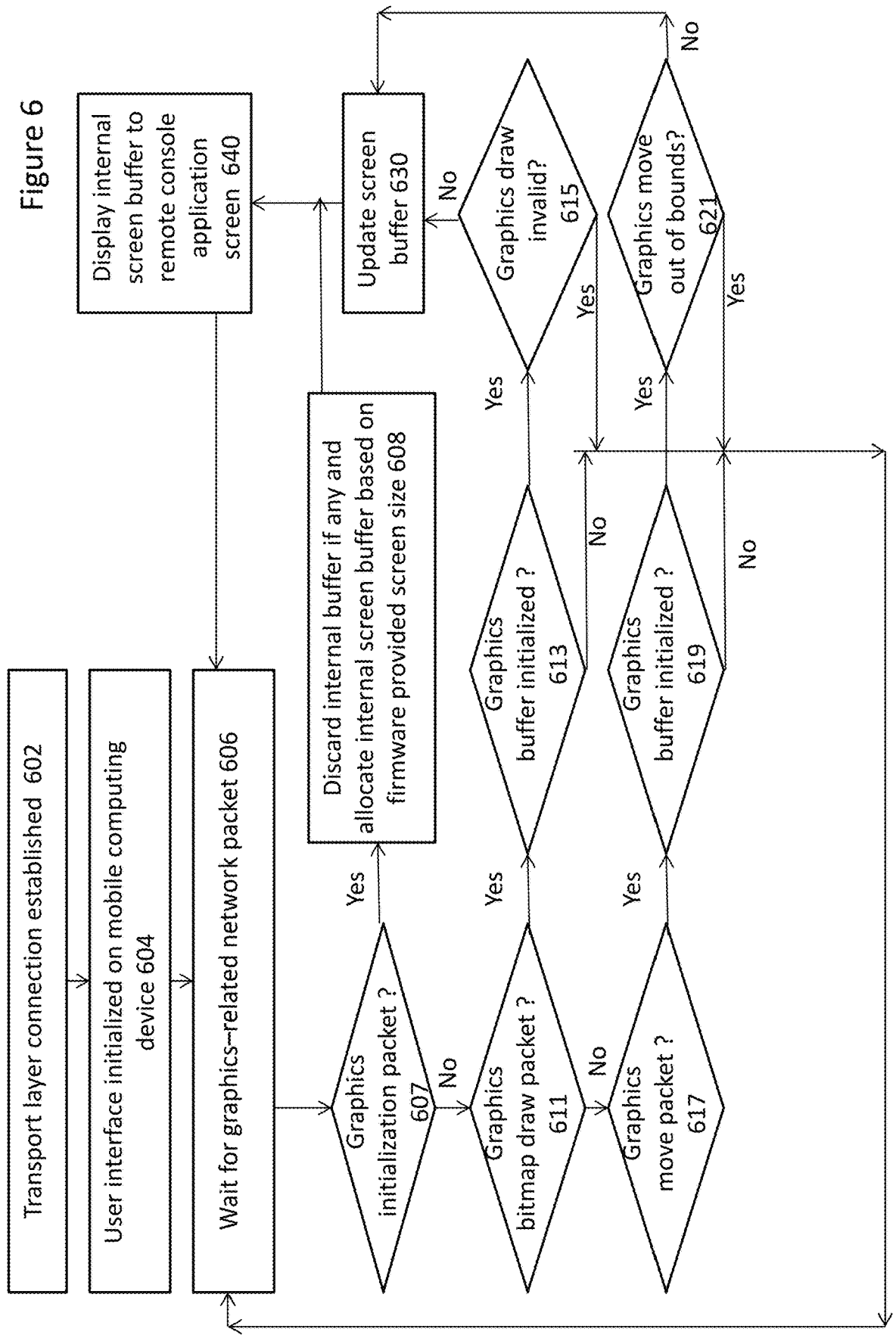
FIG. 6 depicts an exemplary sequence of steps followed by the remote console application in an embodiment of the present invention to handle graphic image-related network packets received from the UEFI-BIOS controlled computing device.

The remote console application of the present invention is also responsible for monitoring network packets coming from the firmware of the UEFI BIOS-controlled computing device and identifying those packets which update the copy of the BIOS user interface on the mobile device. The remote console application maintains and updates the image displayed on the mobile device using the identified graphics packets. FIG. 6 depicts an exemplary sequence of steps followed by the remote console application in an embodiment of the present invention to handle graphic image-related network packets received from the firmware of the UEFI BIOS-controlled computing device. The sequence begins with the establishment of the transport layer connection between the mobile device and the UEFI BIOS-controlled computing device using the method specific to the transport layer as described above (step 602). Following the establishment of the connection, the remote console application initializes the user interface (step 604) which includes setting a flag that indicates that the internal screen buffer is "uninitialized" The internal screen buffer is used to hold a local copy of the UEFI BIOS-controlled computing device's graphical screen, the BIOS screen. Initially, there is no local copy stored in the buffer because the remote console application has no knowledge as to the dimensions or contents of the UEFI BIOS-controlled computing device's graphical screen. The remote console application then waits to receive a graphics-related network packet (step 606). In one embodiment, there are three types of graphics-related packets, graphics initialization packets, graphics bitmap draw packets and graphics move packets that may be identified by the remote console application.

A graphics initialization packet includes the size and other display characteristics of the local BIOS UI (for the UEFI BIOS-controlled computing device) and is sent to the remote console application on the mobile device using a remote console driver in the UEFI firmware. The remote console driver is discussed further below. If the remote console application detects that a graphics-related network packet is a graphics initialization packet (step 607), the remote console application initializes the internal screen buffer based on the size described in the initialization packet checks, discarding any packets from any previous initialization (step 608). A flag for the internal screen buffer is set to "initialized" and the screen contents (at this point empty) are drawn to the remote console application window/screen on the mobile device display (step 640).

A graphics bitmap draw packet describes a rectangular bitmap image, its height and width, and a target X and Y coordinate within the internal screen buffer. If the remote console application detects that a graphics-related network packet is a graphics bitmap draw packet (step 611), the remote console application checks to see if the internal screen buffer has been previously initialized (step 613). If the buffer hasn't been initialized (step 613) or the bitmap image cannot fit within the internal screen buffer (because of illegal size or illegal target X and Y coordinates) (step 615), the remote console application ignores the received bitmap draw packet and returns to waiting (step 606). Otherwise, the contents of the rectangular bitmap image are copied to the rectangular area specified by the X and Y coordinates in the internal screen buffer (step 630). Then the screen contents are displayed to the remote console application window/screen on the mobile device (step 640).

A graphics move packet describes a portion of the internal screen buffer which must be copied to another location in the internal screen buffer. The packet includes a starting X and Y coordinate, a height and width, and a target X and Y coordinate. If the remote console application detects that a graphics-related network packet is a graphics move packet (step 617), the remote console application checks to see if the internal screen buffer has been previously initialized (step 619). If the buffer hasn't been initialized (step 619) or the starting or target coordinates do not fit within the internal screen buffer—are "out of bounds" (step 621), then the packet is ignored and the remote console application returns to waiting (step 606). Otherwise, the screen buffer is updated by moving the portion of the internal screen buffer specified by the starting X and Y coordinates and the height and width to the rectangular portion of the internal screen buffer specified by the target X and Y coordinates and the height and width (step 630). Then the updated screen contents are displayed to the remote console application window/screen (step 640). If the user exits, the application exits (not shown). Otherwise the processing of received graphics packet continues (step 606). In one embodiment, the thread which handles the graphic-related packets is run in parallel with the user-input loop described in FIG. 5. It will be appreciated that the different types of graphics related packets may be detected in any order without departing from the scope of the present invention.

Figure 7:
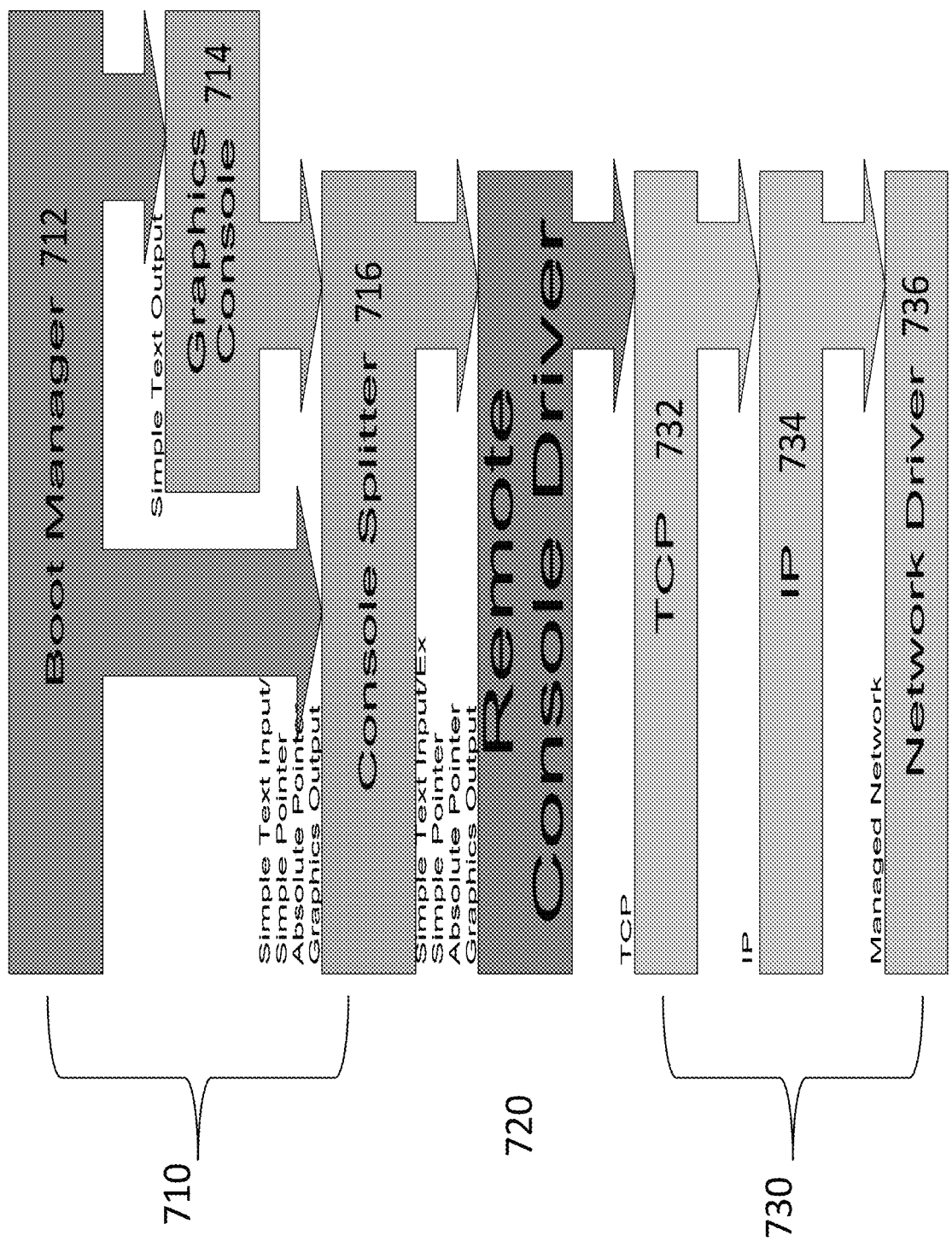
FIG. 7 depicts an exemplary UEFI software stack with a remote console driver utilized in an embodiment of the present invention.

The UEFI BIOS-controlled computing device of the present invention utilizes a remote console driver. An exemplary software stack for UEFI that includes the remote console driver in an embodiment of the present invention is depicted in FIG. 7. In the firmware of the UEFI BIOS-controlled computing device, the remote console driver 720 acts an intermediary between the standard UEFI networking stack 730 (or a proprietary Bluetooth stack) and the standard UEFI console service 710. The UEFI networking stack includes support for Transmission Control Protocol (TCP) services 732 and Internet Protocol (IP) services 734. The UEFI networking stack also includes a network driver 736 for use in network communications. The UEFI console 720 is set up by an application described in the UEFI specification, known as the Boot Manager 712. The Boot Manager 712 combines platform-specific policy with well-defined UEFI configuration variables to connect the necessary device drivers to provide video, keyboard and pointer services to the computing device firmware. On most UEFI systems, this includes two standard components: the graphics console driver (714) (which creates a text console on top of a graphics device) and the console splitter (716), which aggregates keyboard, mouse and graphics services provided by various device drivers so that they appear as a single keyboard, mouse and graphics device to the boot manager (and other UEFI applications). See for example the UEFI Specification, chapter 3, which describes the Boot Manager, and UEFI configuration variables, chapter 11, which describes UEFI console services and graphics output services.

The remote console driver 720 of the present invention manages the connection with the mobile device that is running the remote console application described above. Upon being connected as a console device by the Boot Manager 712, the remote console driver 720 translates incoming network packets from the remote console application into data used by the pointer and keyboard protocols. Likewise, it translates graphic output Application Programming Interface (API) calls from the firmware into network packets to send to the remote console application. In more detail, the UEFI-compliant firmware is instructed to display graphical information through the Blt( ) function of the EFI_GRAPHICS_OUTPUT_PROTOCOL or EFI_UGA_PROTOCOL. For each Blt( ) call that refers to drawing to the screen (EfiBltBufferToVideo), the remote console driver 720 of the present invention generates a network packet containing screen position and bitmap information. For each Blt( ) call that refers to moving video on the screen (EfiBltVideoToVideo), the firmware generates a network packet containing source and destination position information. These packets are used by the remote console application 720 to replicate the screen image as it would appear on the UEFI BIOS-controlled computing device. For each SetMode( ) call, the remote console driver 720 may generate a network packet containing the graphics initialization information, including the desired vertical and horizontal resolution. For each GetMode( ) call, the remote console driver 720 may query the console splitter and essentially duplicate its mode list.

The remote console driver 720 also assists in processing the network packets received from the mobile device which contain the translated user input. UEFI drivers and applications receive information about keys pressed using the SIMPLE_TEXT_INPUT_PROTOCOL or SIMPLE_TEXT_INPUT_EX_PROTOCOL. The remote console driver processes the user input encoded in the network packets and prepares them for use by an instance of these protocols. The remote console driver 720 of the present invention also monitors the arriving keyboard information packets and updates the internal keyboard shift status (which controls the shift, control, alt, logo, menu and system request status) and the keyboard toggle status (which controls the caps lock, number lock and scroll lock). The remote console driver 720 then appends the key presses into the keyboard queue for the UEFI BIOS-controlled computing device. Since UEFI drivers and applications rely on these protocols for all keyboard input, they will behave as if the keystrokes and been performed using a keyboard attached directly to the machine. Each time a key press is added to the queue, the WaitForKey event is signaled. This event is a part of the Simple Text Input or Simple Text Input Ex protocol and allows other drivers and applications to be notified when the key press is received. A Reset( ) function may be used to remove all keys from the queue without resetting the toggle or shift status. The ReadKeystroke( ) and ReadKeystrokeEx( ) functions may be used to retrieve the first entry in the keyboard queue and return it to the user. If there is no key, an error is returned.

As discussed above, the UEFI BIOS firmware also may receive information about translated information regarding mouse movement and mouse button presses from the remote console application on the mobile device. Mouse information is received by a UEFI BIOS-controlled computing device of the present invention using the SIMPLE_POINTER_PROTOCOL and the ABSOLUTE_POINTER_PROTOCOL. The remote console driver 720 of the present invention monitors the mouse button and mouse position packets and updates the internal mouse button status and internal mouse position. Since UEFI drivers and applications rely on these protocols for all pointing device input, they will behave as if the pointing device movement or button presses had been performed using a keyboard attached directly to the machine. A Reset( ) function may be used to center the mouse on the screen and reset the mouse button status. A GetState( ) function may be used to return the relative movement of the mouse since the last read of the mouse position, along with the left and right mouse button status. A WaitForInput event is an event signaled each time the mouse is moved or a button is pressed or released. This event, allows a driver or application to be notified. The Absolute Pointer protocol is very similar to Simple Pointer except that it reports absolute mouse position instead of relative position and adds a $3^{rd}$ mouse button.

Figure 8:
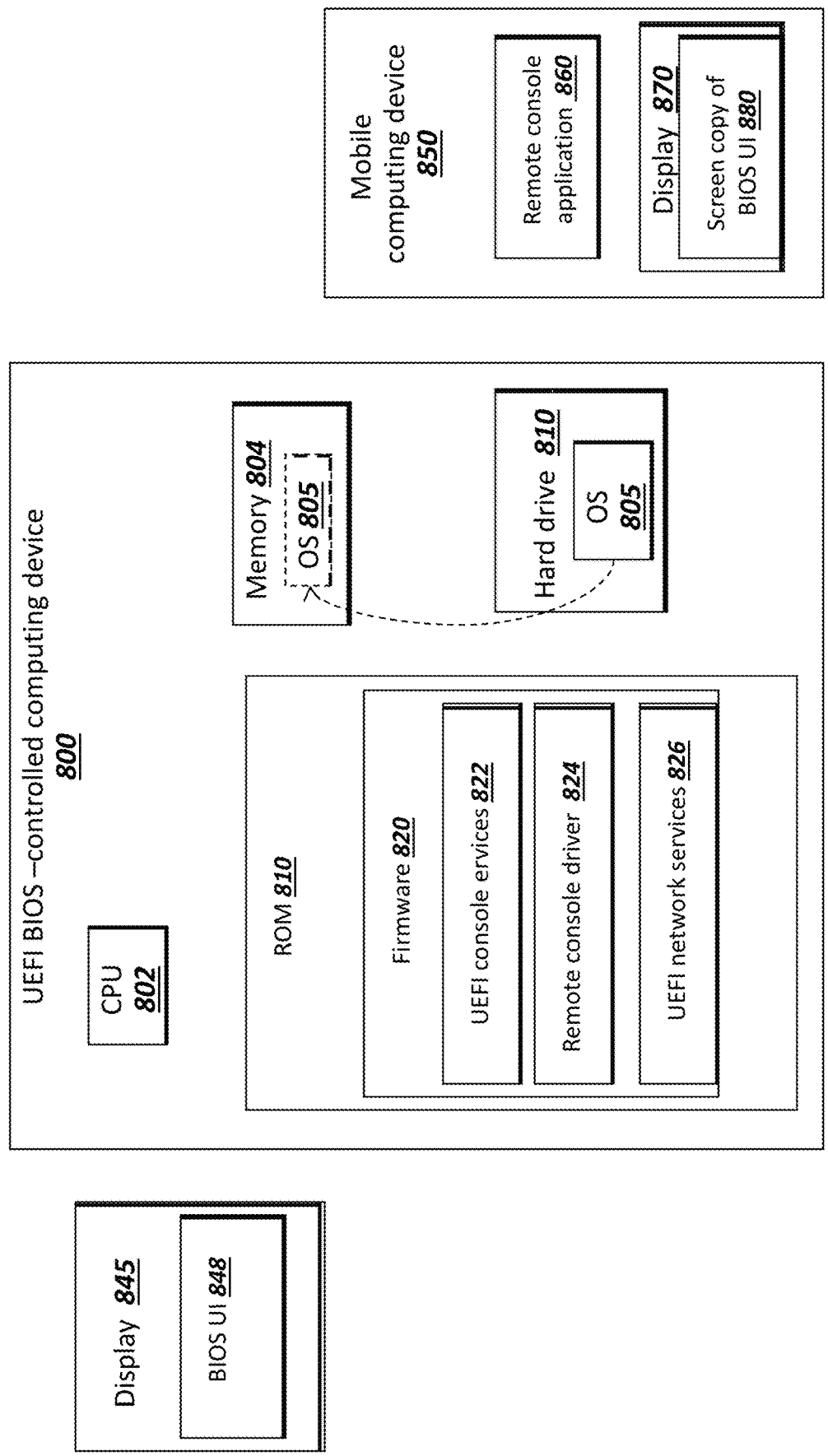
FIG. 8 depicts an exemplary environment suitable for practicing an embodiment of the present invention.

FIG. 8 depicts an exemplary environment suitable for practicing an embodiment of the present invention. A UEFI BIOS-controlled computing device 800 includes a CPU 802 used to process instructions. The computing device 800 may be a PC, laptop computer, tablet computing device, server, or some other type of computing device equipped with a UEFI BIOS and able to communicate with the mobile device as described herein. The computing device 800 may also include a memory 804 such as Random Access Memory (RAM). An OS 805 that is stored on a hard drive 810 or other non-volatile storage that is in, or in a location in communication with, computing device 800 may be loaded into memory 804 as part of a boot process performed by the computing device.

The computing device 800 may also include flash or other ROM 810. In some cases the system design may incorporate multiple ROM devices. ROM 810 may include firmware 820 as described above that is operable at different points of the computing device's operation. The firmware 820 may provide UEFI console services 822 and UEFI network services 826. The firmware 820 may also include remote console driver 824 used to communicate with a remote console application 860 on mobile computing device 850 as described above. The computing device 800 may include or be in communication with a display 845 upon which a local BIOS UI 848 is displayed.

The computing device 800 may be in communication with the mobile communication device 850 over a network connection as described above. The mobile communication device 850, which may be, but is not limited to, a mobile phone, laptop or tablet computing device, may include a display 870 upon which a screen copy of the BIOS UI 880 for the computing device 800 is displayed. A user of the mobile device 850 may make user input actions as described above with respect to the copy of the BIOS UI 880 which are translated and transmitted for processing to the computing device 800 by the remote console application 860.

It should be appreciated that other embodiments are also possible within the scope of the present invention. For example, in one embodiment a BIOS for a non-UEFI BIOS-controlled computing device may be remotely managed. In another embodiment UDP may be used instead of IP. In an additional alternative embodiment the UGA protocol (from EFI 1.10) or the Simple Text Output protocol (which is text oriented, rather than graphics oriented) is supported.

In one embodiment only mouse/keyboard input is supported on the mobile device, but not graphics input. In this embodiment of the present invention, the mobile device is used like a track pad.

In another embodiment, local mouse movements at a UEFI BIOS-controlled computing device are sent to the remote console application on the mobile device to keep the display in sync with the local display of the UEFI BIOS-controlled computing device.

Portions or all of the embodiments of the present invention may be provided as one or more computer-readable programs or code embodied on or in one or more non-transitory mediums. The mediums may be, but are not limited to a hard disk, a compact disc, a digital versatile disc, a flash memory, a PROM, a RAM, a ROM, or a magnetic tape. In general, the computer-readable programs or code may be implemented in any computing language.

Since certain changes may be made without departing from the scope of the present invention, it is intended that all matter contained in the above description or shown in the accompanying drawings be interpreted as illustrative and not in a literal sense. Practitioners of the art will realize that the sequence of steps and architectures depicted in the figures may be altered without departing from the scope of the present invention and that the illustrations contained herein are singular examples of a multitude of possible depictions of the present invention.

The foregoing description of example embodiments of the invention provides illustration and description, but is not intended to be exhaustive or to limit the invention to the precise form disclosed. Modifications and variations are possible in light of the above teachings or may be acquired from practice of the invention. For example, while a series of acts has been described, the order of the acts may be modified in other implementations consistent with the principles of the invention. Further, non-dependent acts may be performed in parallel.

We claim:

1. A method for remotely managing a Unified Extensible Firmware Interface (UEFI) Basic Input/Output System (BIOS)-controlled computing device, comprising:
    establishing a transport layer connection between an application executing on a mobile computing device and firmware executing a UEFI BIOS on a computing device, the transport layer connection established via a direct short-range wireless connection that is one of a Bluetooth connection and a Near Field Communication (NFC) connection;
    receiving at the mobile computing device over the transport layer connection a copy of a screen display for the UEFI BIOS;
    displaying the copy of the screen display on the mobile computing device;
    receiving user input actions via a touch screen interface on the mobile computing device with respect to the screen display;
    translating the user input actions received via the touch screen interface into at least one of keystrokes, mouse button actions and mouse movements;
    transmitting the translated input actions from the mobile computing device to the UEFI BIOS over the transport layer connection; and
    receiving at the mobile computing device, over the connection, screen display updates for the UEFI BIOS following processing of the transmitted input actions by the firmware, the screen updates displayed on the mobile computing device.

2. The method of claim 1 wherein the mobile computing device is a mobile phone or tablet computing device.

3. The method of claim 1 wherein the mobile computing device is not equipped with at least one of a mouse and physical keys for data input.

4. The method of claim 1 wherein the user input action is a movement of the mobile computing device in a pre-defined manner which is captured by at least one of an accelerometer, a gyroscope and a magnetometer.

5. The method of claim 1 wherein the screen update received by the mobile computing device from the firmware is received in a form of a graphics network packet that is at least one of a graphics initialization packet, a graphics bitmap draw packet and a graphics move packet, the graphics initialization packet including a size and display characteristic used in initializing an internal screen buffer for the copy of the screen display, the graphics bitmap draw packet describing a rectangular bitmap image and a target coordinate within the screen buffer, and the graphics move packet describing a portion of the internal screen buffer to be copied to another location in the internal screen buffer.

6. The method of claim 1 wherein the screen updates received by the mobile computing device are generated by a remote console driver in the firmware which translates graphic output Application Programming Interface (API) calls into a graphics network packet sent to the mobile computing device.

7. A non-transitory medium holding computer-executable instructions for remotely managing a Unified Extensible Firmware Interface (UEFI) Basic Input/Output System (BIOS)-controlled computing device, the instructions when executed causing at least one mobile computing device to:
    establish a transport layer connection between an application executing on a mobile computing device and firmware executing a UEFI BIOS on a computing device, the transport connection established via a direct short-range wireless connection that is one of a Bluetooth connection and a Near Field Communication (NFC) connection;
    receive at the mobile computing device over the transport layer connection a copy of a screen display for the UEFI BIOS;
    display the copy of the screen display on the mobile computing device;
    receive user input actions via a touch screen interface on the mobile computing device with respect to the screen display;
    translate the user input actions received via the touch screen interface into at least one of keystrokes, mouse button actions and mouse movements;
    transmit the translated input actions from the mobile computing device to the UEFI BIOS over the transport layer connection; and
    receive at the mobile computing device, over the connection, screen display updates for the UEFI BIOS following processing of the transmitted input actions by the firmware, the screen updates displayed on the mobile computing device.

8. The medium of claim 7 wherein the mobile computing device is a mobile phone or tablet computing device.

9. The medium of claim 7 wherein the mobile computing device is not equipped with at least one of a mouse and physical keys for data input.

10. The medium of claim 7 wherein the user input action is a movement of the mobile computing device in a pre-defined manner which is captured by at least one of an accelerometer, a gyroscope and a magnetometer.

11. The medium of claim 7 wherein the screen update received by the mobile computing device from the firmware is received in a form of a graphics network packet that is at least one of a graphics initialization packet, a graphics bitmap draw packet and a graphics move packet, the graphics initialization packet including a size and display characteristic used in initializing an internal screen buffer for the copy of the screen display, the graphics bitmap draw packet describing a rectangular bitmap image and a target coordinate within the screen buffer, and the graphics move packet describing a portion of the internal screen buffer to be copied to another location in the internal screen buffer.

12. The medium of claim 7 wherein the screen updates received by the mobile computing device are generated by a remote console driver in the firmware which translates graphic output Application Programming Interface (API) calls into a graphics network packet sent to the mobile computing device.

13. A Unified Extensible Firmware Interface (UEFI) Basic Input/Output System (BIOS)-controlled computing device, comprising:
    a processor;
    a network interface; and
    a firmware-managed UEFI BIOS, the firmware when executed:
        transmitting a graphics initialization packet over a transport layer connection to a mobile computing device, the graphics initialization packet including a size and display characteristic used in initializing an internal screen buffer for a copy of a screen display of the BIOS-controlled computing device, the connection established between an application executing on the mobile computing device and the UEFI BIOS, wherein the transport layer connection to the mobile computing device is established via a direct short-range wireless connection that is one of a Bluetooth connection and a Near Field Communication (NFC) connection;

transmitting over the connection to the mobile computing device the copy of the screen display for the UEFI BIOS;

receiving network packets representing user input actions related to the UEFI BIOS from the mobile computing device over the connection;

generating screen display updates for the UEFI BIOS following processing of the received user input actions; and transmitting a copy of the screen updates for the UEFI BIOS to the mobile computing device, a graphics bitmap draw packet and a graphics move packet, the graphics bitmap draw packet describing a rectangular bitmap image and a target coordinate within the screen buffer, and the graphics move packet describing a portion of the internal screen buffer to be copied to another location in the internal screen buffer.

14. The computing device of claim 13, further comprising:
a remote console driver which generates the copy of the screen display update by:
translating the received network packets into data for at least one of a pointer and keyboard protocol used by the UEFI BIOS; and
translating graphic output Application Programming Interface (API) calls, generated by the UEFI BIOS as a result of processing the data, into network packets to be sent to the mobile computing device.

15. A method for remotely managing a Basic Input/Output System (BIOS) of a computing device, comprising:
establishing a connection between an application executing on a mobile computing device and firmware executing a BIOS on a computing device, the connection established via a direct short-range wireless connection that is one of a Bluetooth connection and a Near Field Communication (NFC) connection;
receiving at the mobile computing device over the connection a copy of a screen display for the BIOS;
displaying the copy of the screen display on the mobile computing device;
receiving user input actions via a touch screen interface on the mobile computing device with respect to the screen display;
translating the user input actions received via the touch screen interface into at least one of keystrokes, mouse button actions and mouse movements;
transmitting the translated input actions to the BIOS over the connection; and
receive at the mobile computing device, over the connection, screen display updates for the BIOS following processing of the transmitted input actions by the firmware, the screen updates displayed on the mobile computing device.

16. A computing device with a remotely manageable Basic Input/Output System (BIOS), comprising:
a processor;
a network interface; and
a firmware-managed BIOS, the firmware when executed:
transmitting a graphics initialization packet over a connection to a mobile computing device, the graphics initialization packet including a size and display characteristic used in initializing an internal screen buffer for a copy of a screen display of the BIOS-controlled computing device, the connection established between an application executing on the mobile computing device and the UEFI BIOS,
wherein the connection to the mobile computing device is established via a direct short-range wireless connection that is one of a Bluetooth connection and a Near Field Communication (NFC) connection;
transmitting over the connection to the mobile computing device the copy of the screen display for the BIOS;
receiving network packets representing user input actions related to the BIOS from the mobile computing device over the connection;
generating screen display updates for the BIOS following processing of the received user input actions; and
transmitting a copy of the screen updates for the BIOS to the mobile computing device,
a graphics bitmap draw packet and a graphics move packet, the graphics bitmap draw packet describing a rectangular bitmap image and a target coordinate within the screen buffer, and the graphics move packet describing a portion of the internal screen buffer to be copied to another location in the internal screen buffer.

* * * * *